United States Patent [19]

Marcum

[11] Patent Number: 4,629,153
[45] Date of Patent: Dec. 16, 1986

[54] CONTAINER HOLDER DEVICE

[76] Inventor: Alfred Marcum, 3012 Cedar Point Rd., Crestwood, Ky. 40014

[21] Appl. No.: 681,103

[22] Filed: Dec. 13, 1984

[51] Int. Cl.⁴ .............................................. A47C 7/70
[52] U.S. Cl. ................................... 248/558; 248/311.2; 248/314; 248/DIG. 11; 248/DIG. 12; 108/46; 220/85 H; 224/42.45 R
[58] Field of Search ................. 248/558, 310, 311.2, 248/314, 911, 916, 912, 909, 312.1, 315, 282, 284, 328; 108/46; 215/12 R; 220/85 H; 224/148, 42.45 R

[56] References Cited

U.S. PATENT DOCUMENTS

| 1,208,728 | 12/1916 | Bartlett | 224/205 |
|---|---|---|---|
| 1,326,086 | 12/1919 | Ormandy | 248/311.2 |
| 1,610,344 | 12/1926 | Williams | 224/241 |
| 1,744,103 | 1/1930 | Burrows | 220/85 H |
| 1,782,962 | 11/1930 | Hobbs | 248/313 |
| 2,645,537 | 7/1953 | Brath | 108/46 |
| 2,879,023 | 3/1959 | Barrier | 248/311.2 |
| 2,907,539 | 10/1959 | Vardan | 224/148 |
| 2,933,358 | 4/1960 | Sheble | 108/46 |
| 3,045,962 | 7/1962 | Paulus | 248/284 |
| 3,090,478 | 5/1963 | Stanley | 220/85 H |
| 3,269,683 | 8/1966 | Shinaver | 248/313 |
| 3,463,436 | 8/1969 | Foster | 248/311.2 |
| 3,707,272 | 12/1972 | Rasmussen | 248/311.2 |
| 3,712,235 | 1/1973 | Russ | 108/46 |
| 3,734,439 | 5/1973 | Wintz | 248/311.2 |

Primary Examiner—J. Franklin Foss
Assistant Examiner—Robert A. Olson
Attorney, Agent, or Firm—Edward M. Steutermann

[57] ABSTRACT

A receptacle for holding a container where the holder includes a ring member with downwardly depending leg members with laterally segments connected adjacent the ends thereof to form the receptacles and where a foldable and a one end disconnectable handle ring is provided where when the handle is disconnected it can be utilized to connect the structure to a device such as a car and is provided with retainers connected to ring for allowance of strap to be threaded therethrough for carrying of receptacle such as around neck.

5 Claims, 8 Drawing Figures

CONTAINER HOLDER DEVICE

BACKGROUND OF THE INVENTION

The present invention relates, in general to container receptacles and in particular to receptacles for holding cup type devices, where the cup is received within legs forming the receptacle and can be retained therein or can be easily removable therefrom.

A strap connector arrangement is provided to permit the receptacle to be carried around a user's neck and a partially disconnectable and foldable handle arrangement is provided to be formed in one configuration into a hand holder for the container where when the device is disconnected a connector is provided for use with, for example, automobile doors.

No prior art device is known which provides the advantageous features of the present invention. A somewhat related reference, namely U.S. Pat. No. 1,744,103 shows a bucket carrier which includes bale and a ring with downwardly depending leg members terminating in inter connected cross member to form a base. U.S. Pat. No. 1,208,728 shows a receptacle for holding vacuum bottles which includes downwardly depending legs interconnected across the bottom to receive a vacuum bottle or other type container. The reference also teaches an arrangement utilizing strap devices to allow the receptacle to be carried around the neck of the user. U.S. Pat. No. 1,326,086 teaches a milk pail holder having a structure including an upper ring with downwardly depending legs connected to cross members to form a base. The device, also teaches a means for carrying the container around the neck of the user.

U.S. Pat. No. 1,610,344 teaches a golf ball carrier which includes a structure similar to those previously described except that it also includes means to fasten the device to the belt of the user. U.S. Pat. No. 3,269,683 teaches a carrier attachment for open top containers which includes a ring with downwardly depending leg members interconnected across the bottom to form a base and adapted for connection to, for example, a golf cart.

U.S. Pat. No. 1,782,962 teaches a device as previously described for use in carrying bottles and Des. U.S. Pat. No. 162,959 teaches a bottle holder for connection to, for example, an automobile door.

As previously noted, while there are numerous patents relating to devices with structures somewhat similar to those of the present invention, none of the references teaches or even remotely suggests devices with the advantageous features provided by the present invention.

With more particularly, none of the prior art devices teaches a container device having an unique, folding, partially disconnectable means for forming a cup handle when the device is engaged and for forming a flexible utilitarian means of connecting the container to a vertical surface such as a car door where a part of the handle assembly is disconnected.

SUMMARY OF THE INVENTION

The present invention relates particularly to a receptacle to receive a cup, or a cup or can container, which provides numerous alternatives. In one example the carrier has a means for connecting a neck strap to be worn around the neck of the user and further provides a cup type handle for holding the receptacle which holds the container when the handle arrangement is fully engaged and then provides a flexible multihinge arrangement for connecting the carrier around a number of different types of vertical surfaces, such as car doors where means are provided to accommodate different widths and different shapes of car door interiors.

Devices within the scope of the present invention are extremely easily fabricated and are inexpensive. Further the devices within the scope of the present invention can be easily and inexpensively adapted to accommodate a wide variety of different types of containers and different classes of containers. For example, devices within the scope of the present invention can be utilized to accommodate either hot or cold beverages in cans, bottles or beverages poured into a container which can be provided with a device.

A splash lid can be provided for carrying containers such as cans to avoid splashing of the liquid carried in the container when the container is opened.

The arrangements within the scope with the present invention will occur to those skilled in the art upon reading the disclosure set forth hereinafter, the present invention, briefly, provides a receptacle holder for holding a small container including a ring member with downwardly depending leg members connected adjacent the bottom ends thereof and where a foldable and partially disconnectable holder ring is provided where when the holder ring is partially disconnected it can be utilized to connect the structure to a device such as a car door.

While examples of arrangements within the scope of the present invention are illustrated in the accompanying figures, discussed hereinafter, it will be understood that neither the accompanying figures nor the discussion is intended to be by way of limitation but only by way of illustration.

BRIEF DESCRIPTION OF THE DRAWINGS

Examples within the scope of the present invention are illustrated in the accompanying drawings wherein.

DETAILED DESCRIPTION OF THE DRAWINGS

Figures 1, 2:
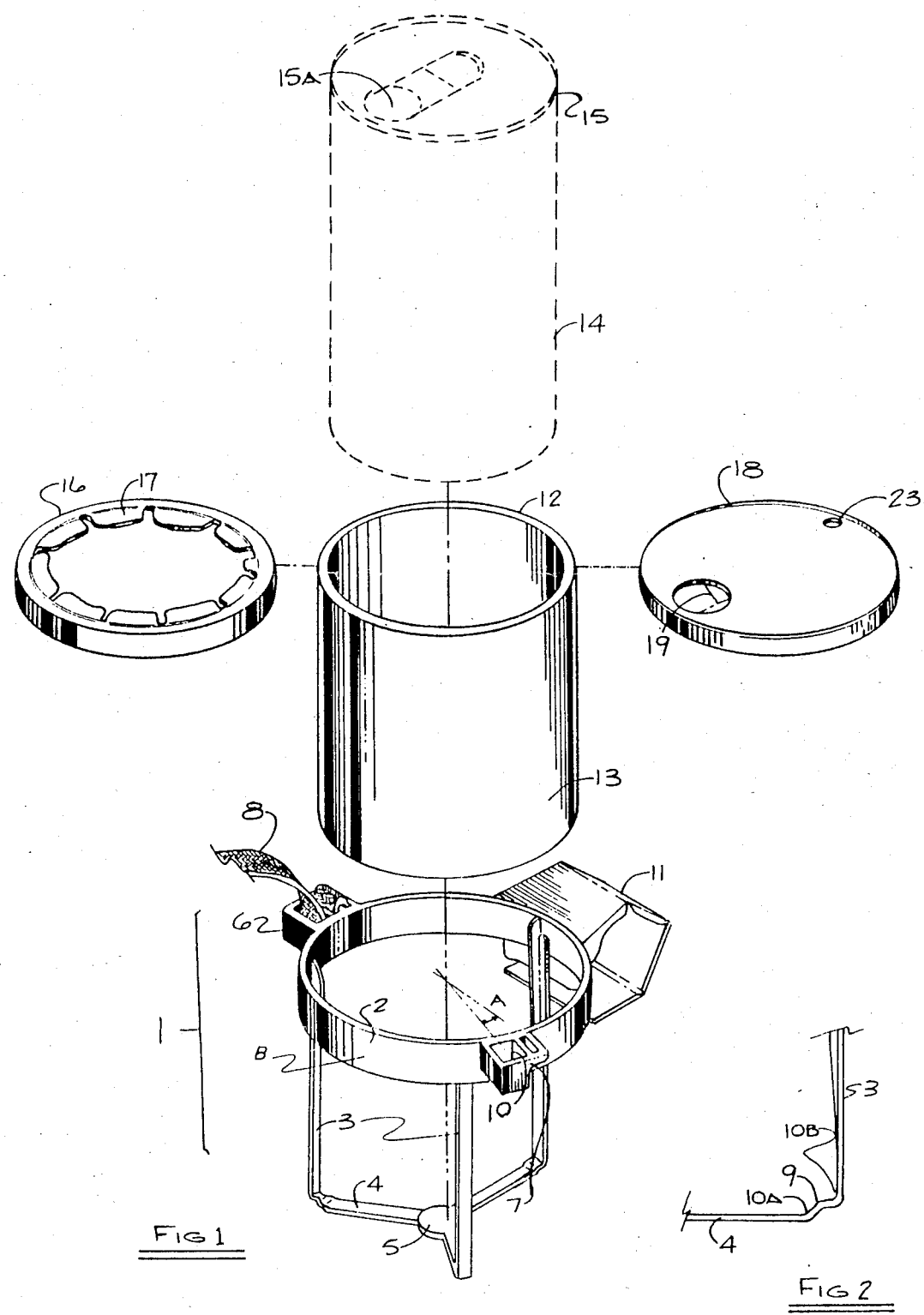
FIG. 1 is an exploded perspective view of a carrier and cup assembly within the scope of the present invention.
FIG. 2 is an enlarged, elevational view, of a portion of one of the legs of the arrangement shown in FIG. 1.

Referring now to FIG. 1 which illustrates within the scope of the present invention, an example of a receptacle 1 in accordance with the present invention is shown and includes a ring 2 having downwardly depending legs 3 with lateral extensions 4 interconnected at a center 5.

Retainers 6 and 7 are provided on opposites sides of ring 2 as shown and include openings 10 adapted to receive a strap 8. The retainers 6 and 7 are located on ring 2 at an angle A off of a diameter of the ring, as shown, so that the straps are located to the rearward part B of the ring when the device is worn with the strap 8 over the neck of the user and with the handle assembly 11, described hereinafter, located opposite the user. When the device is carried by a user with a strap 8 around his neck, the handle 11 extends outwardly from the user's body and out of the way.

It has been found that by locating the retainers 6 and 7 as shown the device is urged toward the users body and when the user bends over the receptacle lips so that the outlet from a container carried in the receptacle, such as a can with a pull tab, tilts forward slightly to move the outlet to the highest point and diminish the likelihood of spillage.

FIG. 2 is a detailed view showing a leg 3 and an extension member 4 where a step 9 is provided defining a first recess 10A and a second recess 10B around the periphery so a two diameter configuration is provided within the receptacle. The first configuration has the diameter represented by the recess 10A while the second, larger diameter, is represented by the recess 10B so that a variety of diameters of containers can be utilized in the receptacle 1, but allows larger rings to be inserted in bottom of the receptacle.

For example, in the arrangements shown a sleeve or cup 13 which can, for example, be of Styrofoam or other insulating materials, such as a double wall plastic container can be received within ring 2 of carrier 1 and would rest on the lip of recess 10A. On the other hand, ring 16 which has a greater diameter could be received within the recess 10B defined at the bottom of the container and would then be adapted to receive, for example, cup 13. Can 4 could then be received in the sleeve or cup 13.

Also within the scope of the present invention, a ring 16 having tabs 17, where the tabs 17 are flexible, can be provided to received around the top 12 of the insulator sleeve or cup 13 so that the can 14 can be received within the insulator sleeve cup 13 exposing top 15 of can 14 and drainage port 15A and retained therein by means of the tabs 17 of ring 16. It will be understood that while the arrangement shown is adapted to provide ring 16 with an external fir, rings with interior fit can also be used.

In accordance with another feature of the present invention, a top 18 can be provided to be received around the top or inside 12 of cup 13 with an aperture 19 where the top 18 is received in an open top container (not shown) (or sleeve 13 if sleeve 13 contained liquid). The top 18 prevents spillage of liquid in the associated container and allows the user to drink through the opening 19. An air hole 23 can be provided in top 18 as shown. In such an arrangement ring 16 would be located in the bottom of receptacle 1 on lip 10B as previously described. Advantageously the diameter of cup 13 would be selected to fit tightly in ring 16 to securely hold the cup and ring in receptacle when the receptacle is worn around the users neck. For use with the receptacle on a car door, as described hereinafter, a tight fit would not be desirable because it is helpful to be able to easily remove cup 13, so the ring can be inserted into receptacle in an inverted position so that cup 13 sits on the ring and facilitates easy removal of cup 13. Both rings 16 and 18 can be utilized in the assembly at all times, on the bottom and one on the top of the container.

The foregoing describes the general overall configuration of the device as presented in FIGS. 1 and 2, and attention is now turned to FIGS. 3A-3D for discussion of the configuration of the handle assembly 11.

Figure 3A:
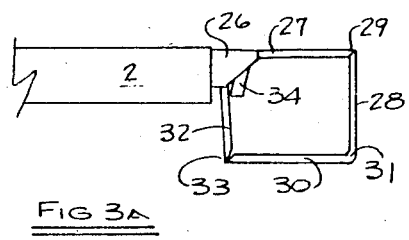
FIGS. 3A-3D illustrate various configurations of the handle device within the scope of the present invention shown on the device of FIG. 1.

FIG. 3A shows the handle in fully closed relation within the device to form a generally square loop which acts as a handle much like a cup handle or storage position of handle when not in use. The handle is carried on ring 2 and is composed of a base 26, a first section 27 connected to a second section 28 by means of a first hinge 29. Section 28 is also connected to another section 30 by means of a solid section 31 so the section 28 and 30 are in fixed angular relation to facilitate formation of the cup handle. Section 30 is also connected to a final section 32 by means of a hinge 33. Thus when the device is folded as shown in FIG. 3A the arrangement forms a generally square shaped configuration with the final section 32 retained behind a tab 34 provided within base 26 to provide a handle for storage.

Figure 3B:
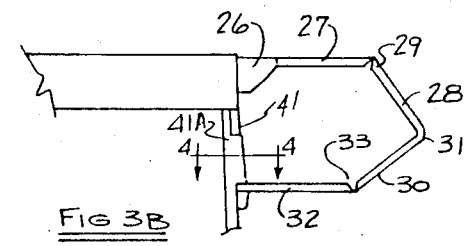
Figure 4:
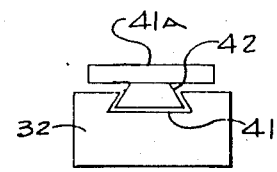
FIG. 4 is a view taken along a plain passing through line 4—4 of FIG. 3B.

FIG. 3B illustrates another arrangement within the scope of the present invention where the vertical member 41A adjacent base 26 of the device includes a tab 41 illustrated in detail in FIG. 4 where the tab 41 has chamfered corners 42 and the end member 32 of the handle assembly previously described includes a recess 43 to be received on the tab 41 to hold the device in position as shown in FIG. 3B. In this configuration a pentagonal shape handle is provided with the hinges 29 and 33 cooperating to form the cup handle arrangement as shown with the solid joint 31 extending outwardly.

Figure 3C:
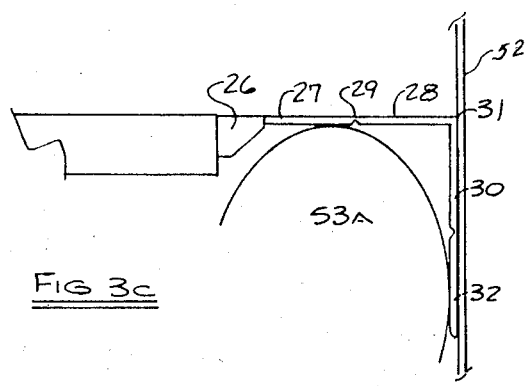
Figure 5:
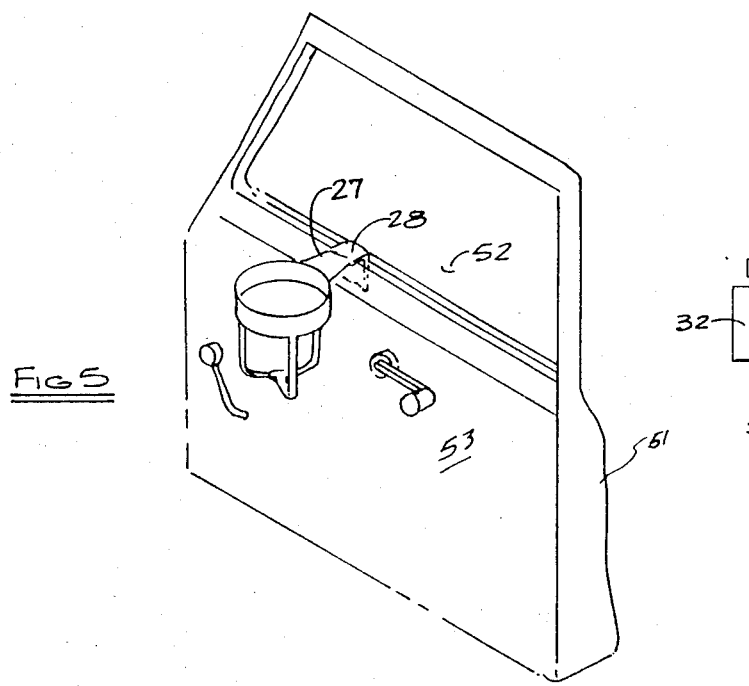
FIG. 5 is an illustration of a cup assembly shown in Figure in place on an automobile door with the handle mechanism partially disengaged.

When the handle arrangement is to be utilized to fasten the device to a car door as illustrated in FIG. 5, where the device is connected to a door 51 and where handle segments 27 and 28 are generally straight, the arrangement shown in FIG. 3C is utilized, that is the first segments 27, 28 extend laterally outwardly from base 26 with hinge 29 in a straight position. The solid joint 31 illustrated as a right angle is useful to assist in insertion of the elements 30 and 32 extend downwardly behind the inside of door 51 and in front of the window 52.

Figure 3D:
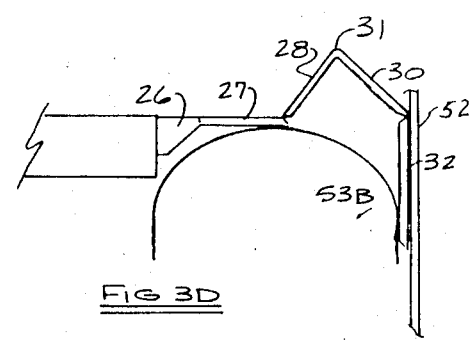

It will be understood that within the scope of the present invention other arrangements, as shown in FIG. 3D and described hereinafter can also be utilized, if the inner panel of the door 51 were wider than shown in FIG. 5, so section 30 is extended laterally from the section 27 and only segment 32 is extended vertically downward and received between the window 52 and the inner panel 51.

In this example, an inner panel 53B which is wider configuration than panel 53A of FIG. 3C is shown with handle segments 27 extended laterally outwardly from the base 26 while the segment 28 is bent upwardly and segment 30 extends downwardly with only the segment 32 located behind the panel 53B as shown.

While only two hinge sections are shown in the foregoing examples it will be understood that other arrangements utilizing different hinge configurations can also be provided within the scope of the present invention.

It will be understood that the foregoing are but a few examples of arrangements within the scope of the present and that other arrangements also within the scope of the present invention will occur to those skilled in the art upon reading the disclosure set forth hereinbefore.

The invention claimed is:

1. A receptacle for holding a container including a ring member, leg member depending downwardly from said ring means with laterally extending segments connected at one end to said leg members and mutually connected at the other ends of each to form the receptacle, a foldable handle means having one end connected to said ring where the handle member is segmented so to allow said handle means to be inserted between the inner panel and the window of an automobile and includes handle fastener means carried adjacent the free end of said handle to attach said free end to one of said leg members to form a generally ring shaped handle and said handle fastener means includes dovetail means carried by said leg member and cooperative groove means in said free end to receive said dovetail means to form said handle ring.

2. The invention of claim 1 wherein each of said laterally extending elements includes offset means adjacent said leg member to which said element is connected to form a receptacle bottom of first and second diameters.

3. The invention of claim 1 wherein said ring member includes strap fastener means located each on opposite sides thereof to receive flexible strap means.

4. The invention of claim 3 wherein said strap fastener means are located at an interval less than 180 degrees on said ring means.

5. The invention of claim 4 wherein said 180 degree interval is located on the side of said ring member opposite said handle member.

* * * * *